US012589265B2

(12) United States Patent
Ijadi-Maghsoodi et al.

(10) Patent No.: US 12,589,265 B2
(45) Date of Patent: Mar. 31, 2026

(54) RESCUE HOIST WITH CABLE RELEASE SAFETY PROVISION

(71) Applicant: Hornet AcquisitionCo, LLC, Vancouver, WA (US)

(72) Inventors: Bejan Ijadi-Maghsoodi, San Dimas, CA (US); Vanessa Quintana, Corona, CA (US); Patrick Sherry, Long Beach, CA (US); Zachary V Limas, Upland, CA (US)

(73) Assignee: HORNET ACQUISITIONCO, LLC, Vancouver, WA (US)

( * ) Notice: Subject to any disclaimer, the term of this patent is extended or adjusted under 35 U.S.C. 154(b) by 94 days.

(21) Appl. No.: 18/642,441

(22) Filed: Apr. 22, 2024

(65) Prior Publication Data

US 2025/0325847 A1     Oct. 23, 2025

(51) Int. Cl.
*B66D 1/34*     (2006.01)
*A62B 1/16*     (2006.01)
*B66D 1/58*     (2006.01)
B64C 27/08     (2023.01)

(52) U.S. Cl.
CPC .................. *A62B 1/16* (2013.01); *B66D 1/34* (2013.01); *B66D 1/58* (2013.01); *B64C 27/08* (2013.01)

(58) Field of Classification Search
CPC ... B66D 1/28; B66D 1/30; B66D 1/34; B66D 1/54; B66D 1/58; B66D 3/26; B66D 2700/0183; B65H 75/28; B65H 75/44
See application file for complete search history.

(56) References Cited

U.S. PATENT DOCUMENTS 1,437,987 A * 12/1922 Miller ..................... B66D 1/34
                                                              242/602.1
2,151,837 A * 3/1939 Burke ..................... F16G 11/02
                                                              403/201

(Continued)

FOREIGN PATENT DOCUMENTS

CN        109368527        2/2019
DE    102021101144 A1 * 7/2022 ............... B66D 1/34

(Continued)

OTHER PUBLICATIONS

European Patent Office, European Search Report dated Jan. 7, 2026 in Application No. 25171418.4.

*Primary Examiner* — Victoria P Augustine
*Assistant Examiner* — Henrix Soto
(74) *Attorney, Agent, or Firm* — SNELL & WILMER L.L.P.

(57)     ABSTRACT

A rescue hoist including a cable drum assembly generally including a cable drum having a cable groove and a recess positioned at one end of the cable groove, a shear pin extending transverse across the recess, and a cable assembly including a cable routed along the cable groove and a cable hook mounted to one end of the cable. In use, to secure the cable assembly to the cable drum, the cable hook is received in the recess and hooked around the shear pin according to a predefined installation sequence. In use, to provide a cable release provision, the shear pin includes spaced reduced diameter sections positioned on opposing lateral sides of the cable hook configured to shear in response to a load on the cable exceeding a predefined threshold load value.

20 Claims, 11 Drawing Sheets

(56)          References Cited

U.S. PATENT DOCUMENTS

| | | | | | |
|---|---|---|---|---|---|
| 2,329,943 | A | * | 9/1943 | Robins ..................... | B66D 1/34 |
| | | | | | 242/903 |
| 2,420,594 | A | * | 5/1947 | Hall ....................... | G01N 21/43 |
| | | | | | 254/DIG. 15 |
| 2,421,788 | A | * | 6/1947 | Henry ..................... | B66D 1/34 |
| | | | | | 254/DIG. 15 |
| 2,571,341 | A | * | 10/1951 | Cordrey .................. | B66D 1/34 |
| | | | | | 242/587.1 |
| 3,809,334 | A | | 5/1974 | Beurer et al. | |
| 5,122,007 | A | | 6/1992 | Smith | |
| 7,009,123 | B2 | | 3/2006 | Banville et al. | |
| 7,108,248 | B2 | * | 9/2006 | Winter .................... | B66D 1/34 |
| | | | | | 254/371 |
| 7,536,754 | B2 | | 5/2009 | Campbell et al. | |
| 9,758,358 | B2 | * | 9/2017 | Mupende ................ | B66D 1/30 |
| 11,840,430 | B2 | | 12/2023 | Ijadi-Maghsoodi et al. | |
| 2002/0104918 | A1 | * | 8/2002 | Zacharias ................ | B66D 1/34 |
| | | | | | 242/587.1 |
| 2017/0291787 | A1 | * | 10/2017 | Sabatier ................ | E21B 19/008 |
| 2019/0135593 | A1 | | 5/2019 | Titus et al. | |
| 2023/0146376 | A1 | * | 5/2023 | Laukkanen .............. | B66D 1/34 |
| | | | | | 242/579 |

FOREIGN PATENT DOCUMENTS

| | | | | | | |
|---|---|---|---|---|---|---|
| EP | 001034 | B1 | | 9/1981 | | |
| GB | 704961 | A | * | 3/1954 | .............. | B66D 1/34 |
| GB | 918872 | A | * | 2/1963 | .............. | B66D 1/34 |
| JP | H09110385 | A | * | 4/1997 | | |
| KR | 200469101 | Y1 | * | 9/2013 | .............. | B66D 1/34 |
| WO | WO-9005107 | A1 | * | 5/1990 | ............ | B63B 21/22 |
| WO | 9405929 | | | 3/1994 | | |
| WO | WO-2008041850 | A1 | * | 4/2008 | ............ | B66B 7/062 |

* cited by examiner

RESCUE HOIST WITH CABLE RELEASE SAFETY PROVISION

TECHNICAL FIELD AND BACKGROUND

The present disclosure relates generally to a hoist, and more particularly, to a rescue hoist with a cable release shear pin for overload protection.

Rescue hoists for aircraft and other applications generally operate to hoist persons and objects. Rescue hoists typically include a motor-driven cable drum, a length of cable wound on the drum, and a hook or other effector coupled to the free end of the cable. In use, the cable drum is rotated in opposite directions to wind and unwind the length of cable from the cable drum.

For safety reasons and to prevent damage to the rescue hoist and the airframe, the cable is required to detach from the rotating drum in the event of overload, for instance when the hook or cable becomes caught or hung up on a grounded object. In traditional rescue hoists, the cable is attached to the cable drum using set screws or a frangible end cap mounted to the cable. In the case of set screws, the capacity to resist cable detachment is proportional to the torque applied to the set screws, and to the coefficient of friction between the set screws and the cable. In the case of a frangible end cap, cable detachment is determined by a predefined failure set point built into the end cap. In use, when the cable is overloaded, the cable is either pulled from the grip of the set screws or the end cap fractures to allow the cable to detach from the cable drum.

Set screws are disadvantageous for requiring consistent torquing for reliable and repeatable performance. In addition, set screws require special tooling that results in difficult installation and removal of the cable during routine maintenance. Frangible end caps are disadvantageous for requiring precise manufacturing of the cable assembly. In addition, the entire cable assembly must be replaced each time the frangible end cap plastically deforms.

Therefore, what is needed is a rescue hoist with a provision for cable release for overload protection that overcomes the disadvantages of prior art cable attachments.

BRIEF SUMMARY

According to one aspect, the inventive concepts according to the present disclosure are directed to a cable drum assembly including a cable drum having a cable groove and a recess positioned at one end of the cable groove, a shear pin extending transverse across the recess, and a cable assembly including a cable routed along the cable groove and a cable hook mounted to one end of the cable. In use, to attach the cable assembly to the cable drum, the cable hook is received in the recess and hooked around the shear pin according to a predefined installation sequence. In use, to provide a provision for cable release in the event of overload, the shear pin includes spaced reduced diameter sections positioned on opposing lateral sides of the cable hook configured to shear in response to a load on the cable exceeding a predefined threshold load value.

In some embodiments, the shear pin is removably received in an opening formed through one end of the cable drum.

In some embodiments, the cable drum assembly further includes a shear pin retention mechanism including a retention plate positioned in a recess formed in the one end of the cable drum, the retention plate including a first portion for engaging against a head of the shear pin and a second portion defining spaced openings, and threaded fasteners each configured to be received through one of the spaced openings and threadably engaged in the cable drum to secure the retention plate to the cable drum.

In some embodiments, each of the threaded fasteners includes a head having at least one radial opening for receiving an anti-rotation cable for constraining rotation of the installed threaded fasteners.

In some embodiments, the shear pin has an annular head having a tangential chamfer, the recess formed in the one end of the cable drum has a linear end wall, and when the shear pin is installed in the cable drum, the linear end wall interacts with the tangential chamfer to constrain rotational motion of the shear pin relative to the cable drum.

In some embodiments, the cable drum assembly further includes spaced bushings mounted in the opening formed through the one end of the cable drum, wherein the shear pin is received through the spaced bushings.

In some embodiments, the cable hook is swaged onto the one end of the cable.

In some embodiments, the shear pin is positioned relative to the recess such that the cable hook is installable only in a direction opposite a winding direction of the cable around the cable drum.

In some embodiments, the recess is configured to constrain lateral motion of the cable hook to maintain a position of the cable hook relative to the spaced reduced diameter sections of the shear pin.

According to another aspect, the inventive concepts according to the present disclosure are directed to a cable release assembly including a shear pin removably installable in a recess formed in a rotatable cable drum, and a cable assembly including a cable and a cable hook mounted to one end of the cable. In use, the cable hook is configured to be hooked around the shear pin, and the shear pin includes spaced reduced diameter sections positioned on opposing lateral sides of the cable hook configured to shear in response to a load on the cable exceeding a predefined threshold load value.

In some embodiments, when the cable hook is hooked around the shear pin, a longitudinal axis of the cable hook is orthogonal to a longitudinal axis of the shear pin.

In some embodiments, the shear pin is stainless steel.

In some embodiments, the shear pin is removably installed in the rotatable cable drum transverse to the recess formed in the cable drum, the cable hook is positioned in the recess, and the cable hook is laterally constrained in the recess such pulling force on the cable is orthogonal to a longitudinal axis of the shear pin.

According to a further aspect, the inventive concepts according to the present disclosure are directed to a rescue hoist including a frangible shear pin mounted to a rotatable cable drum, and a cable assembly having a cable hook mounted to one end of the cable, wherein the cable hook is hooked around the shear pin according to a predetermined installation sequence in which the cable hook is first hooked around the shear pin with the cable assembly oriented in a direction opposite a winding direction of the cable assembly around the cable drum.

In some embodiments, the cable drum includes a helical groove defined by an upstanding helical rib, and the cable assembly includes a length of cable wound along the helical groove.

In some embodiments, the cable hook, when hooked around the pin, opens in a direction facing away from a rotational axis of the cable drum.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
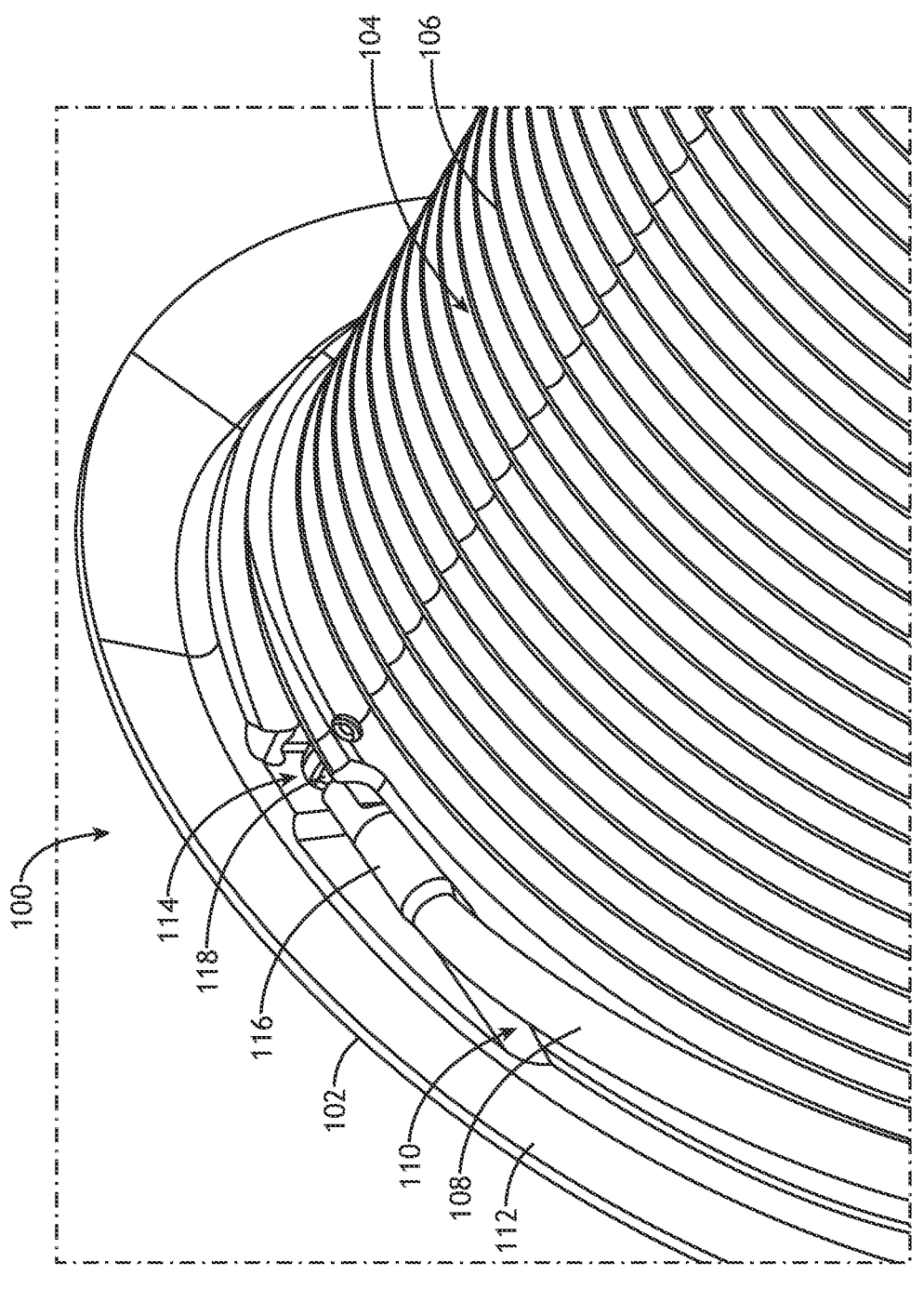
FIG. 1 is a fragmentary isometric view of a cable drum assembly, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1$a$, 1$b$). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a cable drum assembly including a provision for cable release for overload protection, as well as a rescue hoist including the cable drum assembly with the cable release provision. In some embodiments, the rescue hoist may be a compact, under-wing mounted rescue hoist for aircraft such as helicopters, rotorcraft, and the like. In embodiments, the cable drum assembly includes a rotatable drum including a shear pin, and a cable assembly having a cable hook mounting at one end of a length of cable for removably attaching the cable assembly to the rotating cable drum. In embodiments, the cable hook is configured to hook around the shear pin according to a predetermined installation sequence in which the installation direction is opposite the winding direction to prevent the cable assembly from unintentionally detaching from the cable drum. According to the predetermined installation sequence, the cable hook is installed while the cable is slacked, and in the direction opposite the winding direction, such that the cable is under tension is operation thereby preventing inadvertent release of the mechanism.

In embodiments, during normal use of the rescue hoist (i.e., load on the cable not exceeding a predefined threshold load value), the shear pin remains intact to maintain attachment of the cable assembly to the cable drum. During an overload condition (i.e., load on the cable exceeding the predefined threshold load value), the shear pin is configured to plastically deform (e.g., shear or fracture) to allow the cable assembly to detach from the cable drum. In embodiments, the shear pin is engineered to fracture at predefined reduced diameter sections flanking the left and right sides of a cable hook swaged to one end of the cable. Thus, in embodiments, the present invention provides the benefit of a double shear value as opposed to prior art solutions that operate based on tensile failure.

FIG. 1 illustrates a cable drum assembly 100 according to an embodiment of the present disclosure. The cable drum assembly 100 generally includes a cable drum 102 having a helical cable groove 104 formed along an outer circumferential surface of the cable drum. In embodiments, the cable groove 104 is defined by an upstanding helical rib 106. In use, a length of cable 108 of a cable assembly 110 is wound around the outer circumferential surface of the cable drum 102 by being received in and routed along the helical cable groove 104. The cable groove 104 defines a winding direction for the length of cable 108. As shown in the perspective of FIG. 1, the winding direction is counterclockwise for comparison reasons pertaining to an installation direction of the cable assembly 110 as discussed in detail below. The cable drum 102 further includes upstanding annular flanges 112 positioned at the opposing ends of the cable drum for constraining lateral motion of the wound cable assembly 110.

The cable drum 102 further includes a recess 114 positioned at one end of the helical cable groove 104. In use, the recess 114 receives a cable hook 116 mounted to one end of the length of cable 108, for instance swaged to the end of the length of cable 108. A shear pin 118 is mounted to the cable drum 102 and extends transverse across a portion of the recess 114. In use as shown, the cable hook 116 is received in the recess 114 and is hooked around the shear pin 118 to attach the cable assembly 110 to the rotatable cable drum 102. During normal use of the cable drum assembly 100, the load on the cable 108 does not exceed a predefined load value and the cable assembly 110 remains attached to the cable drum 102. When a predefined load value on the cable 108 is exceeded (e.g., greater than 800 lbs) the shear pin 118 is configured to fracture according to a predefined breakage to allow the cable assembly 108 to detach from the cable drum 102. In embodiments, the cable drum 102 may be motor-driven in opposite directions to wind and unwind the length of cable 108. In embodiments, the cable hook 116 may be swaged onto the cable end and configured to hold up to about 1200 lbs of pulling force, such that the shear pin fractures at a threshold load value that is less than the load value required to detach the cable hook 116 from the cable 108.

Figure 2:
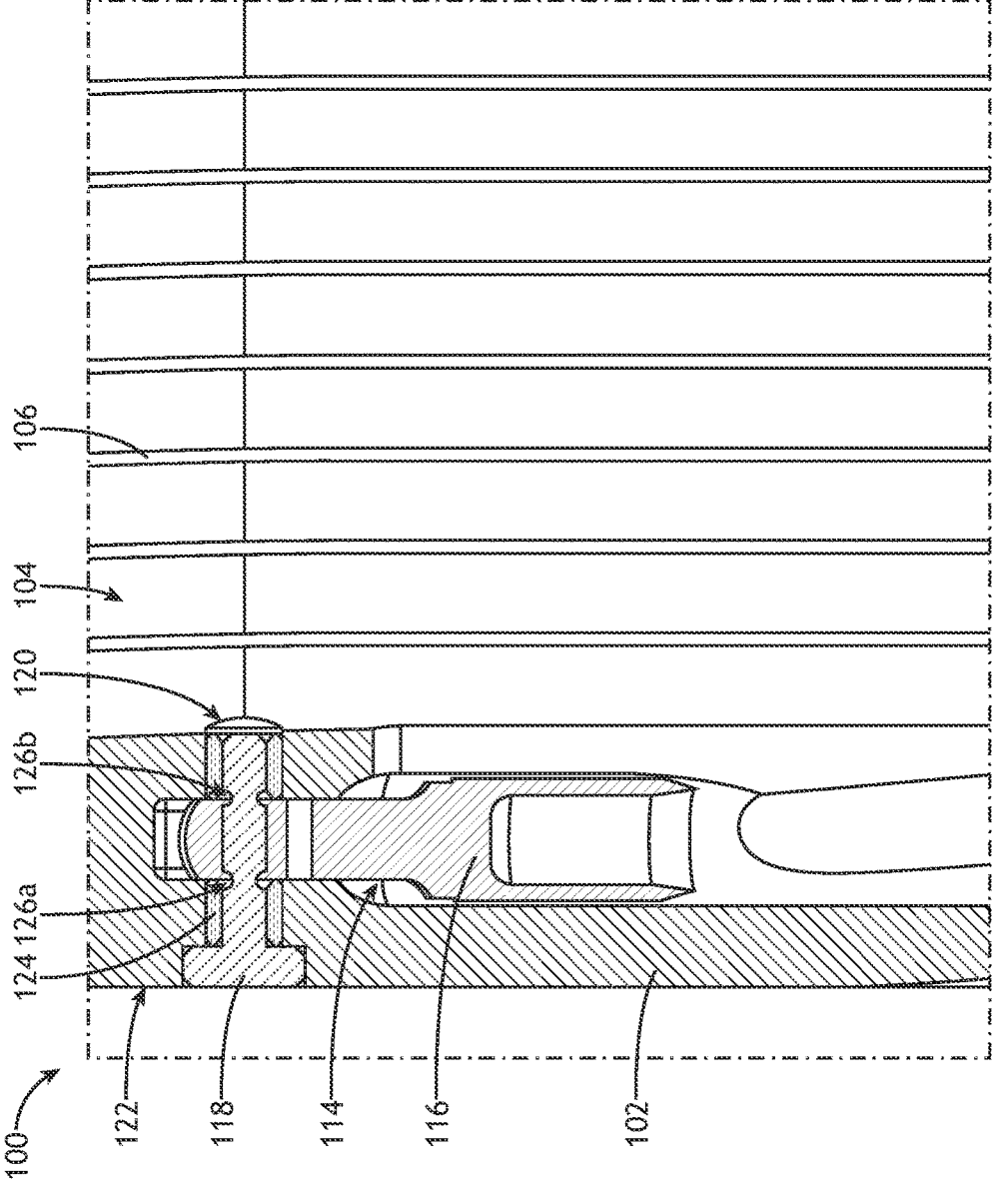
FIG. 2 is a cross-sectional view of a provision for cable release of the cable drum assembly, in accordance with example embodiments of this disclosure.

FIG. 2 illustrates a partial sectional view of the cable drum assembly 100. The cable hook 116 is received in the recess 114 formed at one end of the cable groove 104. In embodiments, the recess 114 and the cable hook 116 are correspondingly shaped to constrain lateral motion of the cable hook 116 when installed in the recess 114. The shear pin 118 is received in an opening 120 formed in one end 122 of the cable drum 102. In some embodiments, the shear pin 118 may be mounted in an optional at least one bushing 124 mounted in the opening 120. In embodiments, the shear pin 118 includes spaced reduced diameter sections 126a, 126b positioned on or adjacent the opposing lateral sides of the cable hook 116. In use, these reduced diameter sections 126a, 126b introduce a tunable weakness into the shear pin 118 such that the shear pin 118 shears when a predefined threshold load value on the cable is exceeded (e.g., 800 lbs).

By mounting the shear pin 118 transverse across the recess 114, installing the cable hook 116 orthogonal to the longitudinal axis of the shear pin 118, and constraining lateral motion of the cable hook 116, the aforementioned arrangement ensures that the pulling force on the cable is orthogonal or substantially orthogonal to the longitudinal axis of the shear pin 118, thus ensuring that the reduced diameter sections 126a, 126b shear simultaneously or at least substantially simultaneously. In embodiments, other types of weaknesses may be introduced into the shear pin 118 to cause the shear pin to fracture when a predefined load value on the cable is exceeded. In use, the shear pin 118 fractures as a safeguard to protect the cable drum 102, the rescue hoist, the airframe, etc. In embodiment, the shear pin 118 is the sacrificial component to further protect the cable assembly from being damaged. The shear pin 118, as opposed to set screws and/or the cable assembly itself, can be produced at a low cost with a high reliability, predictable tolerance, and long lifespan. In embodiments, the shear pin 118 may be stainless steel and may be tempered to be made brittle in order to shear.

Figure 3:
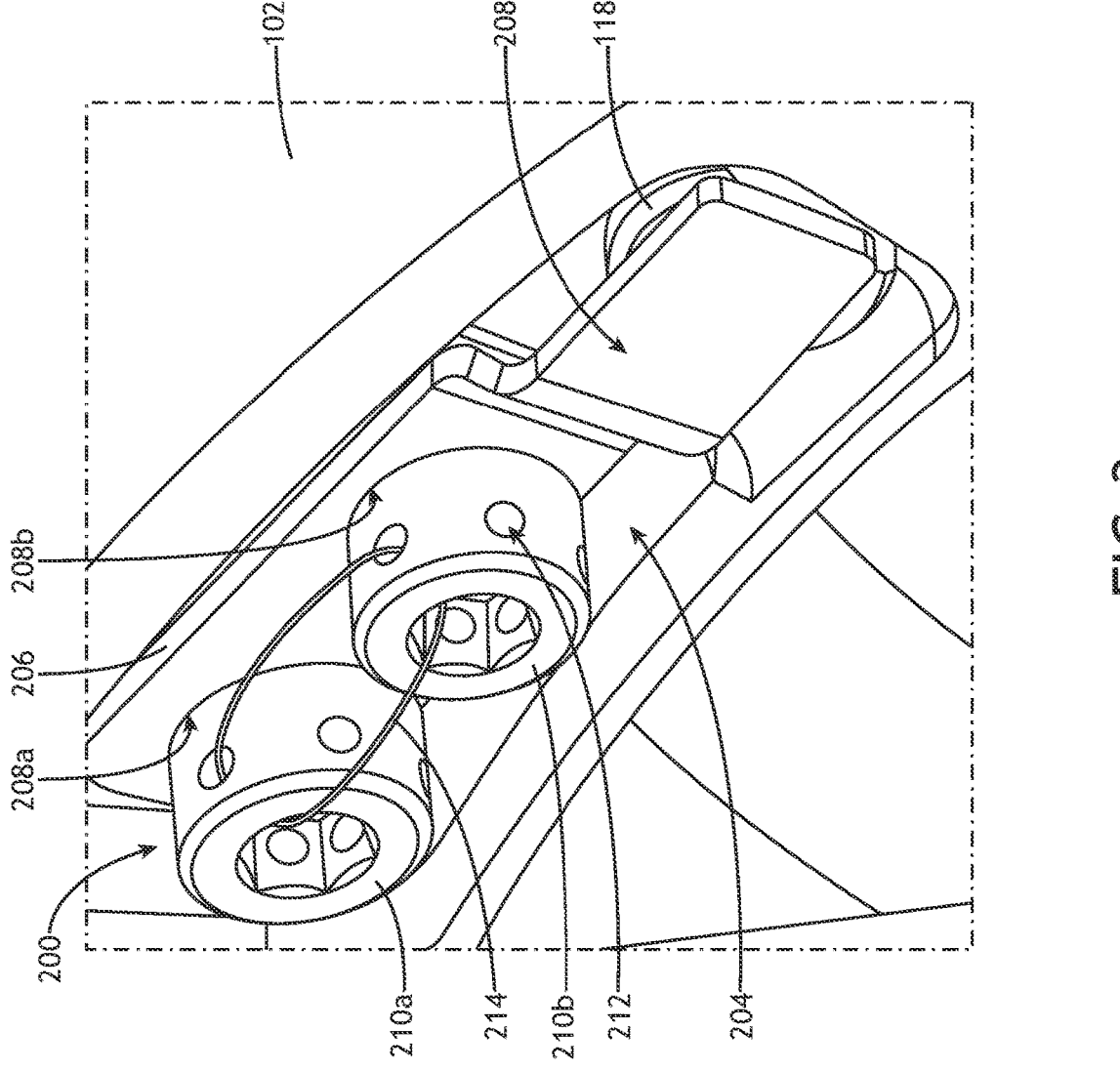
FIG. 3 is an isometric view of a shear pin retention mechanism of the cable drum assembly, in accordance with example embodiments of this disclosure.

FIG. 3 illustrates a retention mechanism 200 for retaining the shear pin 118 to the cable drum 102. In embodiments, the retention mechanism 200 includes a retention plate 202 positioned in a recess 204 formed in the one end of the cable drum 102. In embodiments, the retention plate 202 may include a first portion 206 for engaging against the head of the shear pin 118, and a second portion defining spaced openings 208a, 208b. An externally-threaded fastener 210a, 210b is configured to be received through each one of the spaced openings 208a, 208b and threadably engaged in an internally-threaded opening formed in the one end of the cable drum 102. In use, the fasteners 210a, 210b are advanced into the cable drum 102 to tighten the retention plate 202 against the end of the shear pin 118 to maintain the shear pin 118 in place. In some embodiments, each fastener 210a, 210b may include a head having at least one radial opening 212 for receiving an anti-rotation cable 214 for constraining rotation of the threaded fasteners 210a, 210b.

Figure 4:
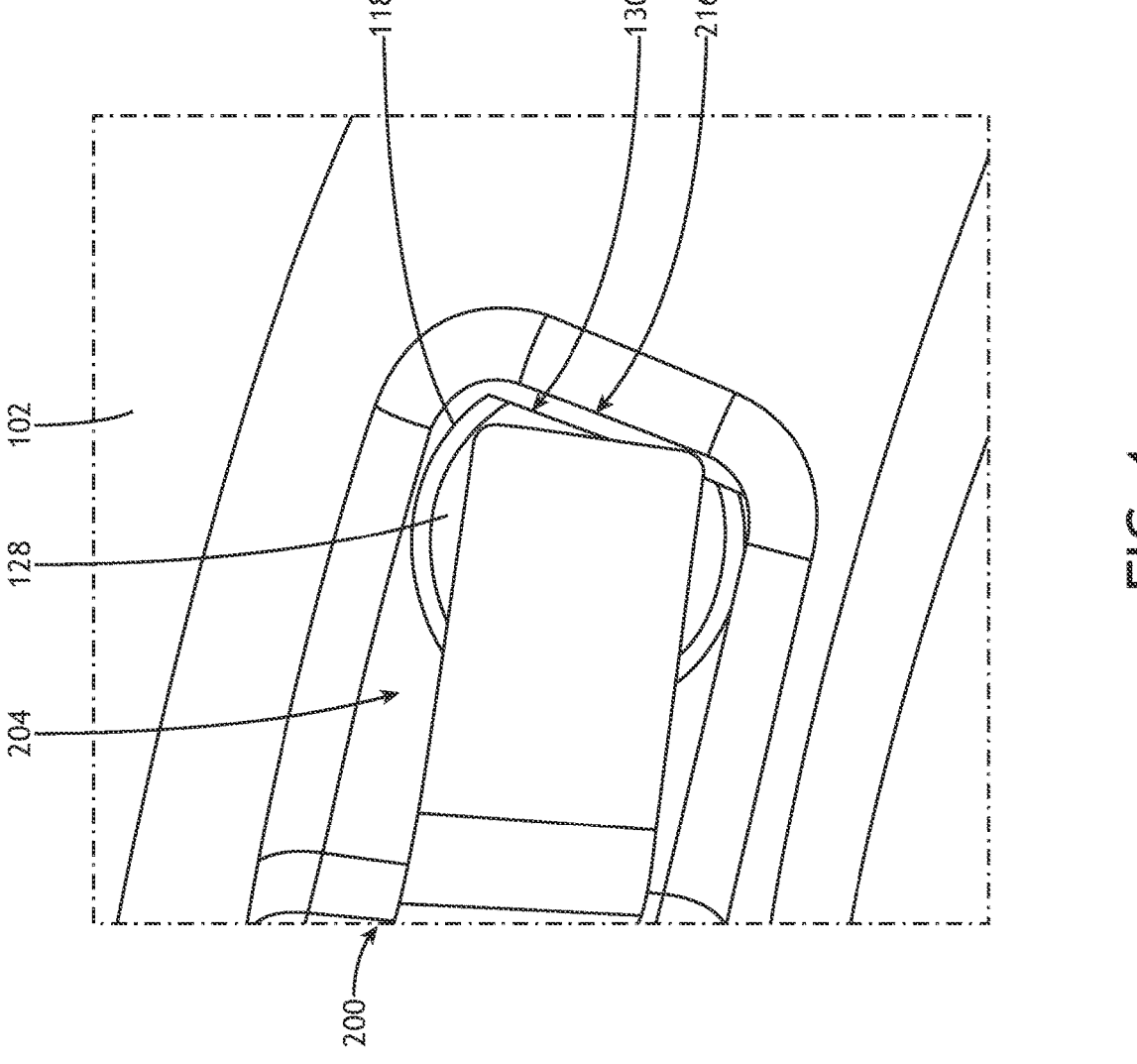
FIG. 4 is side view of a shear pin rotation limiting feature of the cable drum assembly, in accordance with example embodiments of this disclosure.

FIG. 4 illustrates a feature of the retention mechanism 200 for constraining rotation of the shear pin 118. In embodiments, the shear pin 118 has an annular head 128 having a tangential chamfer 130 or linear portion. The recess 204 formed in the end of the cable drum 102 has a linear end wall 216. The shear pin 118 is installed in the cable drum 102 such that the tangential chamfer 130 and the linear end wall 216 are positioned together such that the linear end wall 216 interacts with the tangential chamfer 130 to constrain rotational motion of the shear pin 118 relative to the cable drum 102. In embodiments, rotation may be prevented entirely or may be tuned to permit rotational freedom of about 10° to about 20°, for example.

Figure 5:
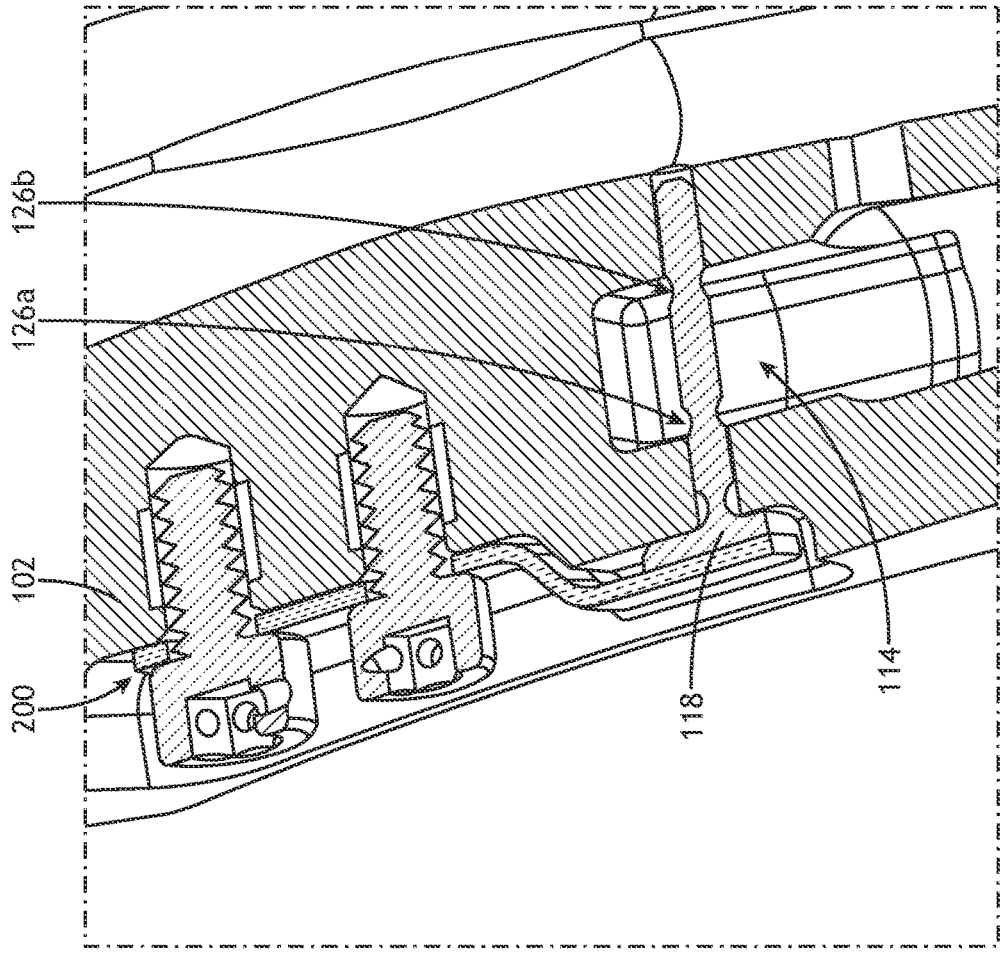
FIG. 5 is a cross-sectional view of the shear pin and shear pin retention mechanism of the cable drum assembly, in accordance with example embodiments of this disclosure.

FIG. 5 is a cross-sectional view illustrating the arrangement of the retention mechanism 200 holding the shear pin 118 in place within the cable drum such that the shear pin 118 extends transverse across the recess 114. In this arrangement, the shear pin 118 is position such that the reduced diameter sections 126a, 126b are not supported by the cable drum 102, whereas the non-reduced diameter sections outwards of the reduced sections are supported by the cable drum 102. In this configuration, the radii of the reduced diameter sections 126a, 126b are generously dimensioned to account for misalignment and the shear pin 118 is supported outside of the radii.

Figure 6A:
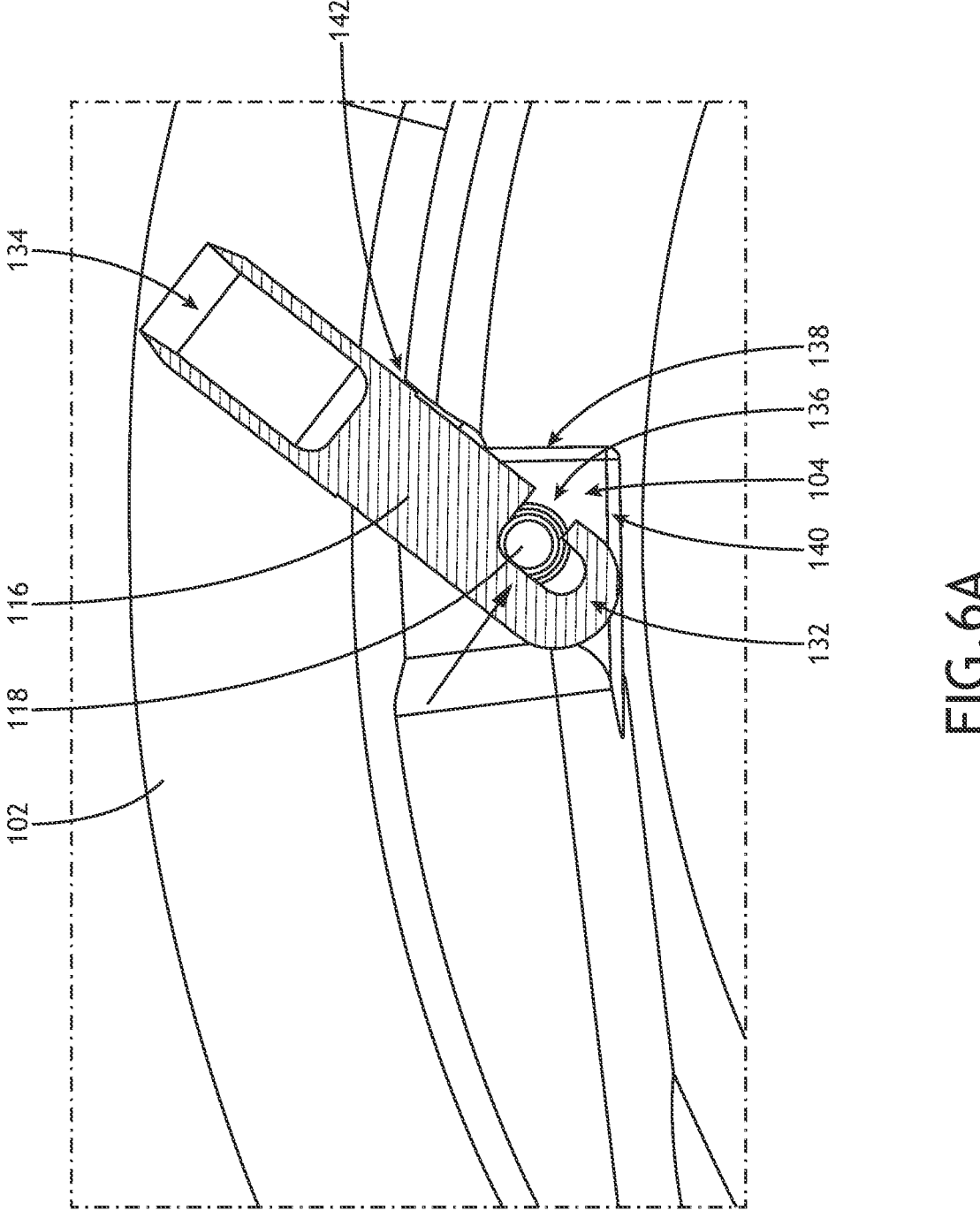
FIGS. 6A-6C illustrate the sequential steps for attaching a cable end to the cable drum; in accordance with example embodiments of this disclosure.
Figure 6B:
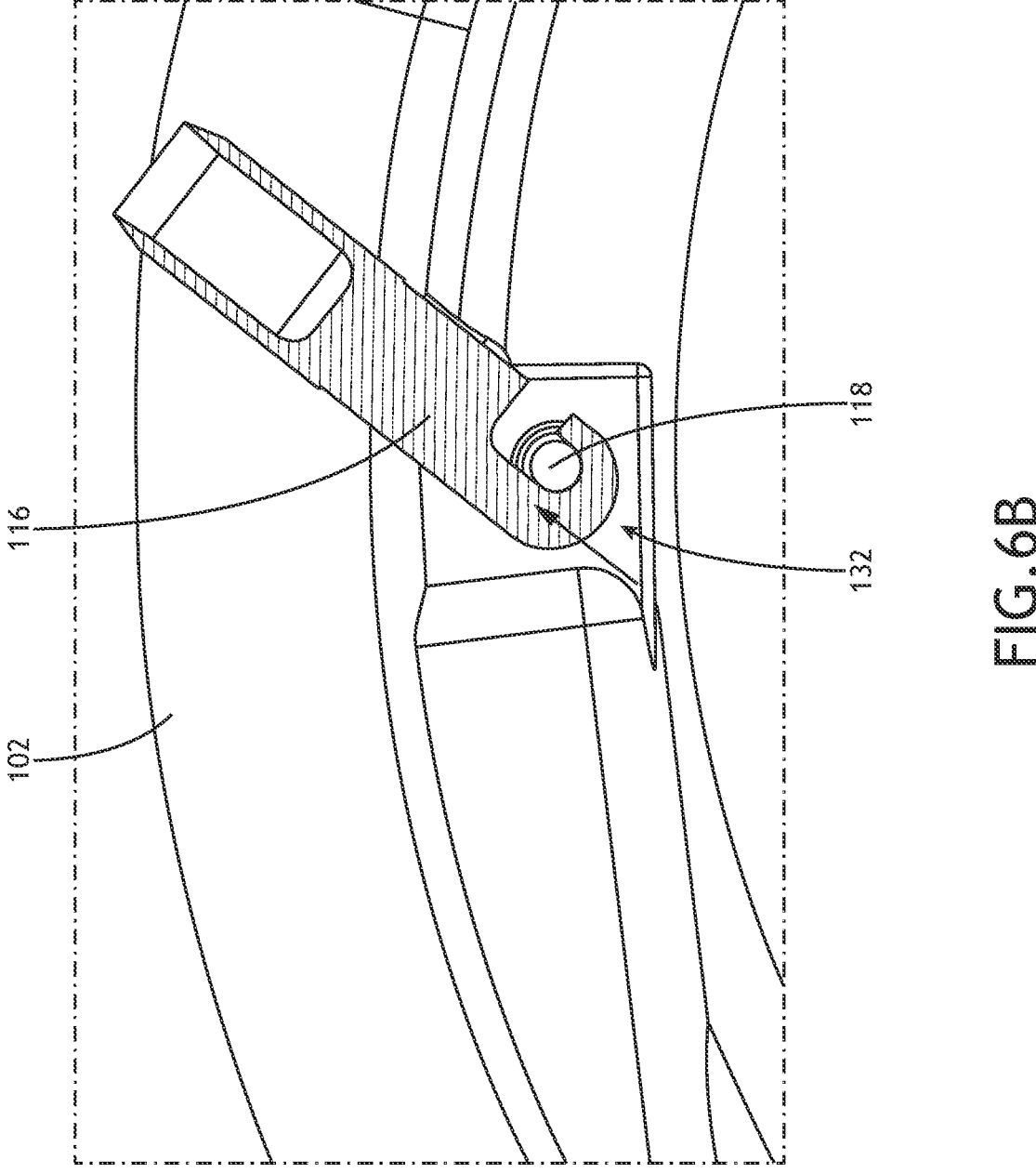
Figure 6C:
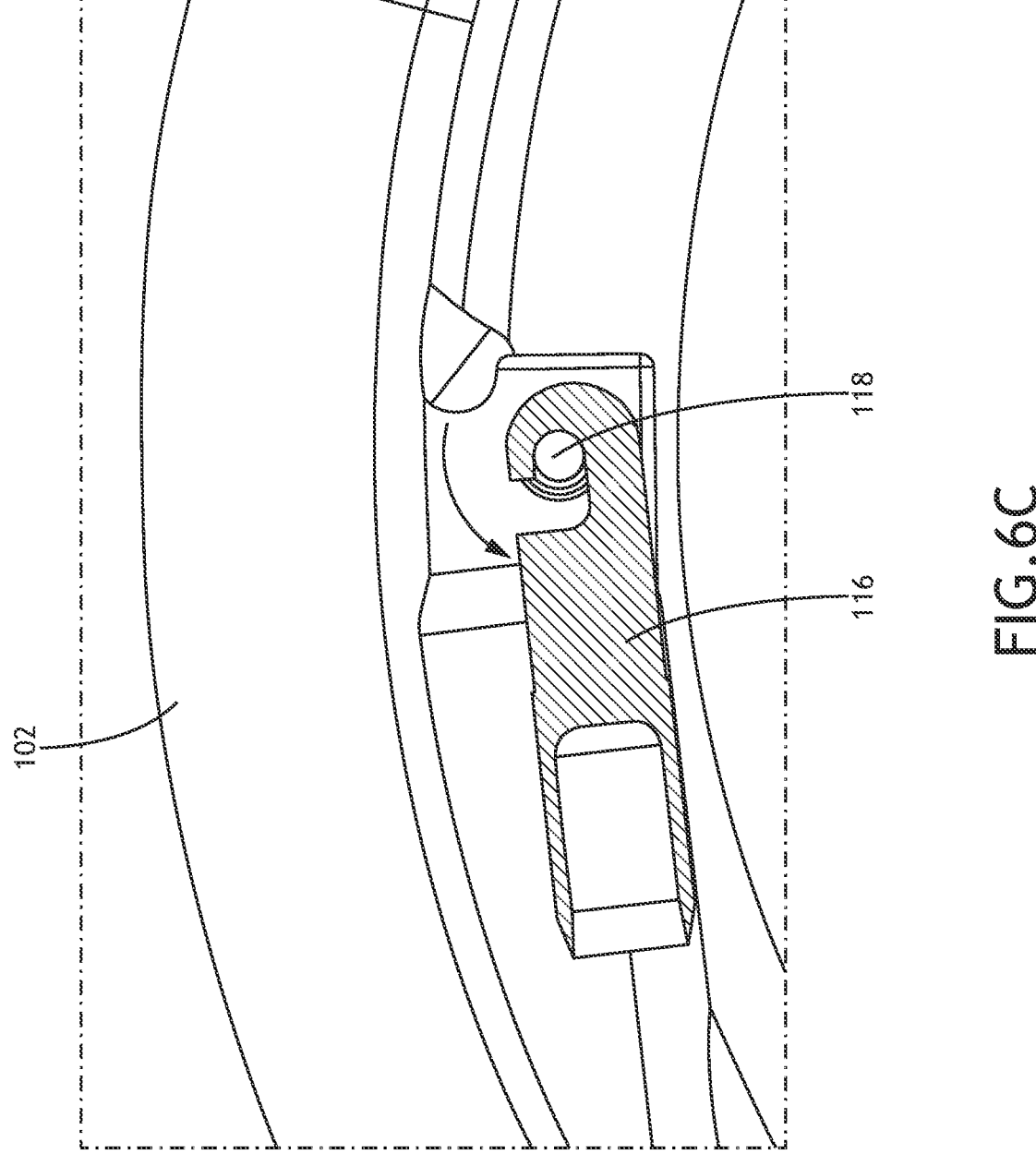

FIGS. 6A-6C illustrate the sequential steps for attaching the cable hook 116 to the cable drum 102. In embodiments, the cable hook 116 has a J-hook 132 formed at the end opposite the swaged coupled end 134, wherein an opening 136 into the J-hook is positioned along one side of the cable hook 116. This configuration, along with the shape of the recess 104 and the position of the shear pin 118 within the recess 104, and particularly relative to the end wall 138 and bottom 140 of the recess, permits cable hook 116 installation according to a predefined installation sequence.

With reference to FIG. 6A, in a first installation step, with the cable slacked, the cable hook 116 is oriented in the direction substantially opposite its winding direction and the shear pin 118 is received in the opening 136 positioned along one side of the J-hook 132. In some embodiments, an angled portion 142 of the end wall 138 of the recess 104 may be provided to set the correct angle of the cable hook 116 for the initial capture of the shear pin 118. With reference to FIG. 6B, in a second installation step, the cable hook 116 is pulled in a direction away from the cable drum 102 to move the shear pin 118 to the end of the J-hook 132 which clears the cable hook 116 for the next rotational step. With reference to FIG. 60, in a third installation step, the cable hook 116 is rotation (e.g., counterclockwise in the perspective shown in FIG. 6C) such that the cable hook 116 comes to rest in the recess and in a winding direction of the cable (e.g., counterclockwise winding in the perspective shown in FIG. 6C).

Figure 7:
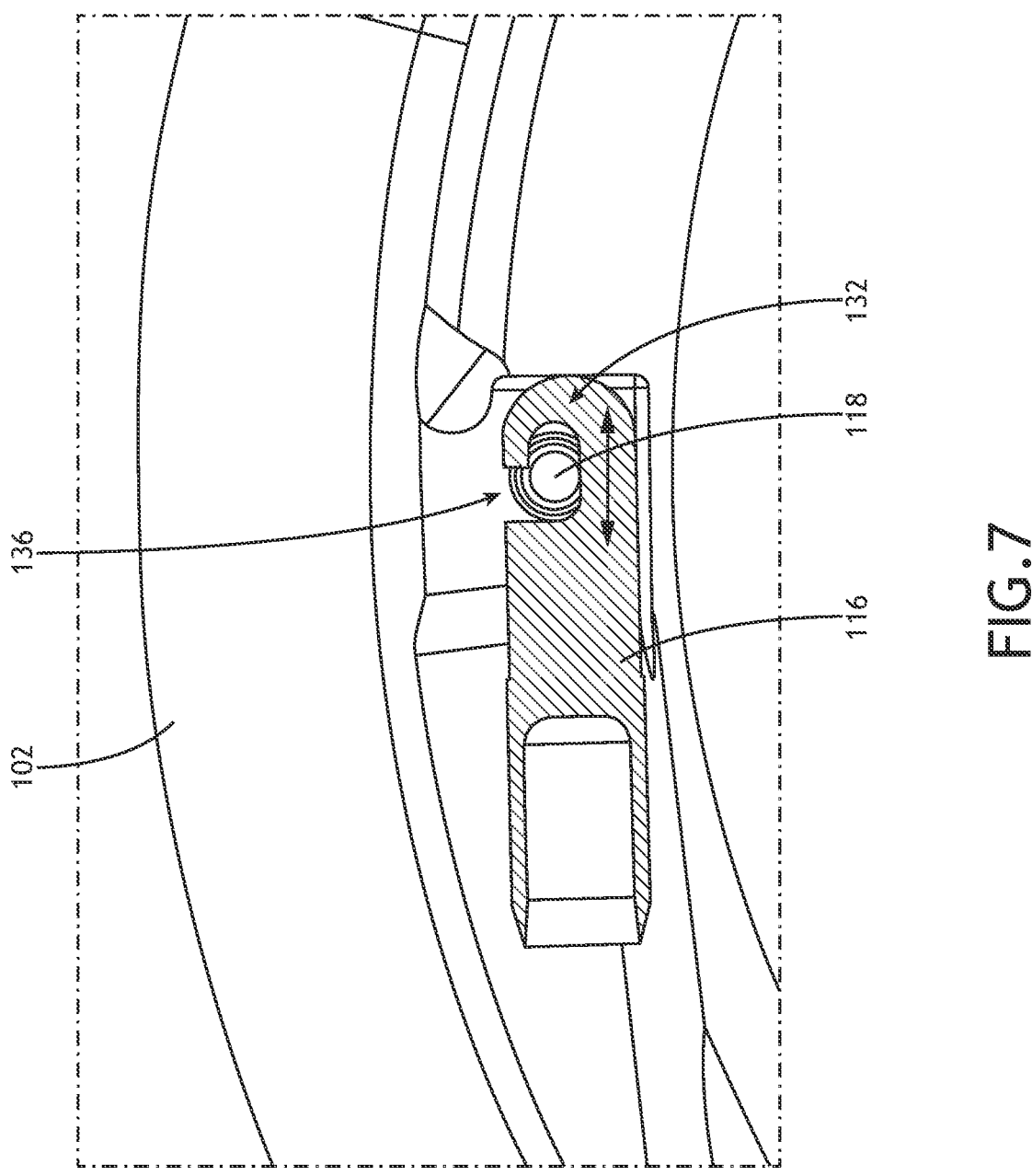
FIG. 7 illustrates permissible cable end motion when attached to the cable drum; in accordance with example embodiments of this disclosure.
Figure 8:
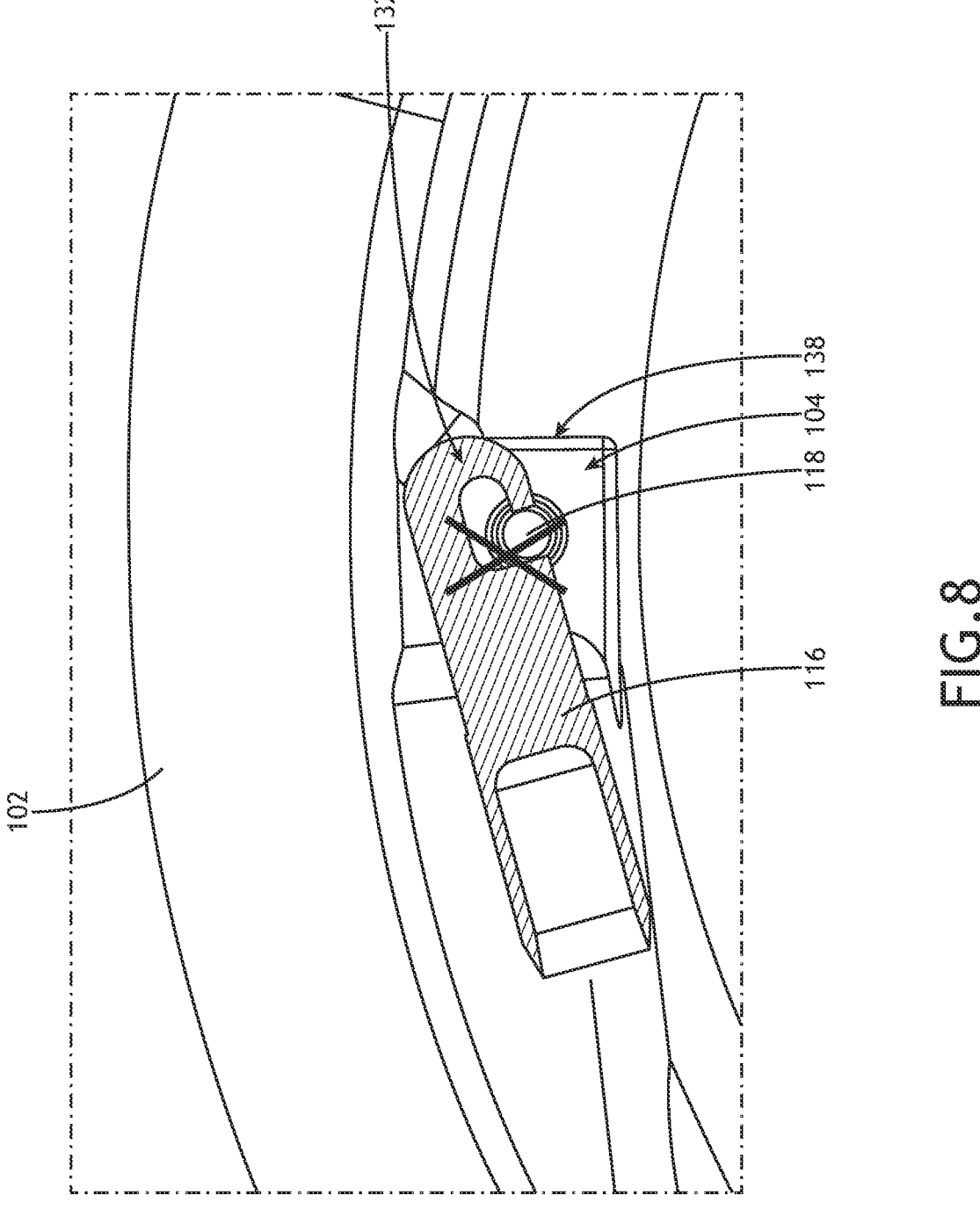
FIG. 8 illustrates impermissible cable end installation; in accordance with example embodiments of this disclosure.

With reference to FIG. 7, once attached, the cable hook 116 is permitted to translate a limited amount in opposite directions, but cannot be unhooked from the shear pin 118 except by the sequential first, second, and third steps above performed in reverse order. In other words, to detach the cable hook 116, the cable hook 116 is first rotated (e.g., clockwise), then translated toward the cable drum 102, and finally translated laterally to remove the shear pin 118 from capture within the cable hook 116. When correctly attached, the opening 136 of the J-hook 132 faces away from the rotational axis of the cable drum 102. With reference to FIG. 8, the cable hook 116 cannot be installed in the cable winding direction due to interference between the J-hook 132 and the end wall 138 of the recess 104. In embodiments, the length of the J-hook 132 is greater than the distance between the shear pin 118 and the end wall 138 to prevent the installation as shown in FIG. 8 which would lead to unintentional cable assembly detachment.

Figure 9:
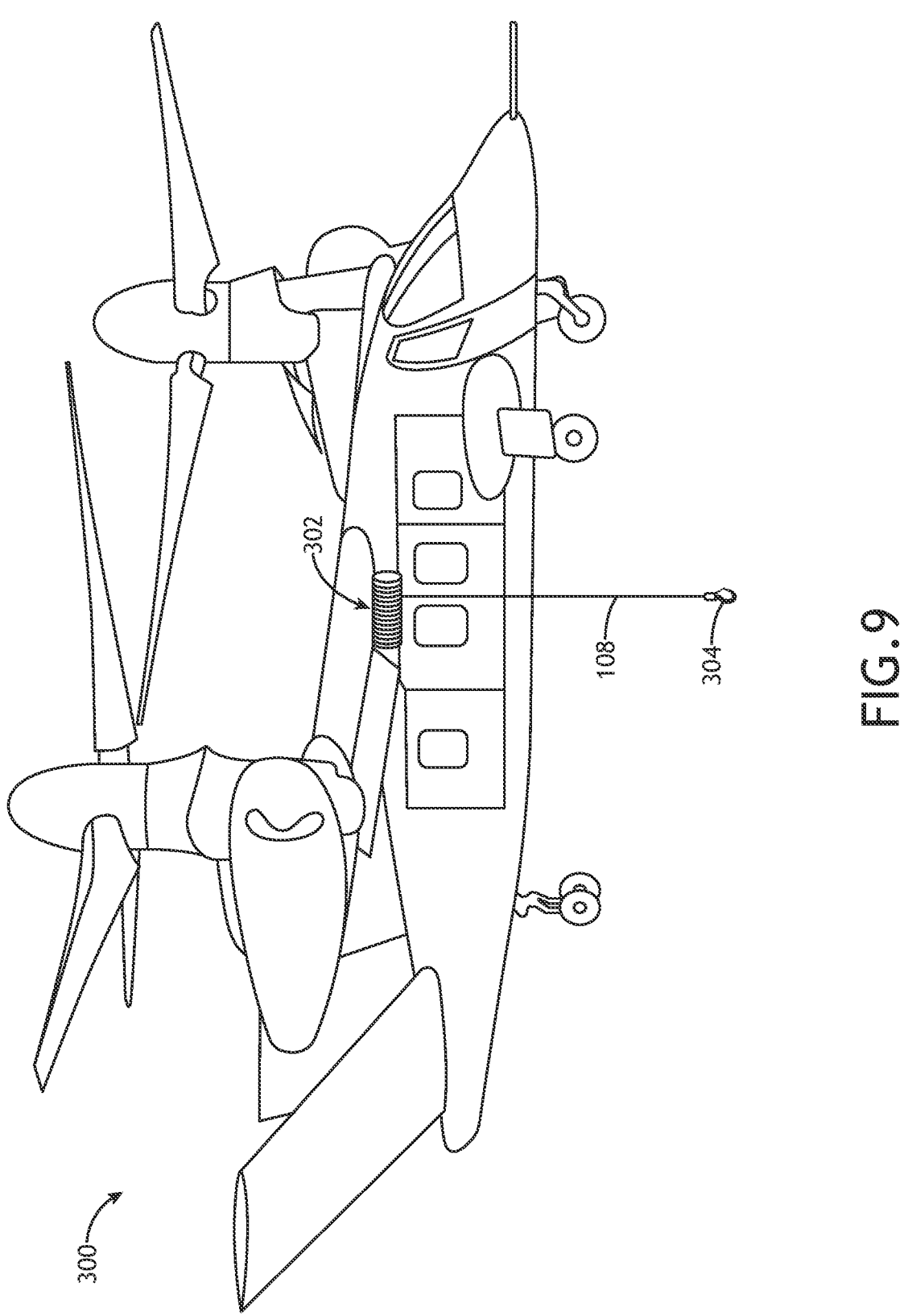
FIG. 9 illustrates a non-limiting example of an aircraft equipped with a rescue hoist including the cable drum assembly, in accordance with example embodiments of this disclosure.

FIG. 9 illustrates an aircraft 300 equipped with a rescue hoist 302 including the cable drum assembly according to the embodiments described herein. In embodiments, a hook 304 or other end effector is mounted to the free end of the cable 108. In embodiments, the rescue hoist 302 includes a housing configured to be mounted to an airframe, for instance under-wing mounted to the aircraft 300. In embodiments, the aircraft 300 may be a tilt-wing rotorcraft and the rescue hoist 302 mounted under-wing. In embodiments, like rescue hoists 302 may be mounted on one or more sides of the rotorcraft depending on the door configuration.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A cable drum assembly, comprising:
a cable drum having a cable groove and a recess positioned at one end of the cable groove;
a shear pin extending transverse across the recess; and
a cable assembly including a cable routed along the cable groove and a cable hook mounted to one end of the cable;
wherein:
to secure the cable assembly to the cable drum, the cable hook is received in the recess and hooked around the shear pin; and
to provide a cable release provision, the shear pin includes spaced reduced diameter sections positioned adjacent opposing lateral sides of the cable hook configured to shear in response to a load on the cable exceeding a predefined threshold load value.

2. The cable drum assembly according to claim 1, wherein the shear pin is removably received in an opening formed through one end of the cable drum.

3. The cable drum assembly according to claim 2, further comprising a shear pin retention mechanism comprising:
a retention plate positioned in a recess formed in the one end of the cable drum, the retention plate including a first portion for engaging against a head of the shear pin and a second portion defining spaced openings; and
threaded fasteners each configured to be received through one of the spaced openings and threadably engaged in the cable drum to secure the retention plate to the cable drum.

4. The cable drum assembly according to claim 3, wherein each of the threaded fasteners includes a head having at least one radial opening for receiving an anti-rotation cable for constraining rotation of the threaded fasteners.

5. The cable drum assembly according to claim 2, wherein:
the shear pin has an annular head having a tangential chamfer;
the recess formed in the one end of the cable drum has a linear end wall; and
when the shear pin is installed in the cable drum, the linear end wall interacts with the tangential chamfer to constrain rotational motion of the shear pin relative to the cable drum.

6. The cable drum assembly according to claim 2, further comprising spaced bushings mounted in the opening formed through the one end of the cable drum, wherein the shear pin is mounted in the spaced bushings.

7. The cable drum assembly according to claim 1, wherein the cable hook is swaged onto the one end of the cable.

8. The cable drum assembly according to claim 1, wherein the shear pin is positioned relative to the recess such that the cable hook is installable only in a direction opposite a winding direction of the cable around the cable drum.

9. The cable drum assembly according to claim 1, wherein the recess receiving the cable hook is configured to constrain lateral motion of the cable hook to maintain a position of the cable hook between the spaced reduced diameter sections of the shear pin.

10. A cable release assembly, comprising:
a shear pin removably installable in a rotatable cable drum; and
a cable assembly including a cable and a cable hook mounted to one end of the cable;
wherein:
the cable hook is configured to be hooked around the shear pin; and
the shear pin includes spaced reduced diameter sections positioned on opposing lateral sides of the cable hook configured to shear in response to a load on the cable exceeding a predefined threshold load value.

11. The cable release assembly according to claim 10, wherein, when the cable hook is hooked around the shear pin, a longitudinal axis of the cable hook is orthogonal to a longitudinal axis of the shear pin.

12. The cable release assembly according to claim 10, wherein the shear pin is stainless steel.

13. The cable release assembly according to claim 10, wherein:

the shear pin is removably installed in the rotatable cable drum transverse to a recess, the cable hook is positioned in the recess; and the cable hook is laterally constrained in the recess such that pulling force on the cable is orthogonal to a longitudinal axis of the shear pin.

14. A rescue hoist, comprising:

a rotatable cable drum;

a shear pin mounted in a recess formed in the rotatable cable drum; and a cable assembly including a length of cable and a cable hook mounted to one end of the length of cable; wherein:

the cable hook is configured to be received in the recess and hooked around the shear pin according to a predefined installation sequence in which the cable hook initially hooks onto the shear pin when the cable hook is oriented in a direction opposite a winding direction of the length of cable along the cable drum; and the shear pin is configured to fracture to release the cable assembly from attachment to the cable drum when a load on the cable exceeds a predefined threshold load value.

15. The rescue hoist according to claim 14, wherein the shear pin is mounted transverse across the recess formed in the rotatable cable drum.

16. The rescue hoist according to claim 14, wherein the cable drum includes a helical groove defined by an upstanding helical rib.

17. The rescue hoist according to claim 14, wherein the cable assembly further comprises a hook mounted to an opposing end of the length of cable.

18. The rescue hoist according to claim 14, wherein the rescue hoist is adapted to be mounted to an aircraft underwing and adjacent an opening in an airframe of the aircraft.

19. The rescue hoist according to claim 14, wherein the cable hook is swaged onto the one end of the length of cable.

20. The rescue hoist according to claim 14, wherein the predefined threshold load value is about 800 lbs.

* * * * *